United States Patent
Mikami

Patent Number: 5,805,295
Date of Patent: Sep. 8, 1998

[54] IMAGE PROCESSING APPARATUS AND METHOD FOR APPLYING SPECIAL IMAGE EFFECTS TO OUTPUT IMAGES

[75] Inventor: Fumio Mikami, Chigasaki, Japan

[73] Assignee: Canon Kabushiki Kaisha, Tokyo, Japan

[21] Appl. No.: 942,155

[22] Filed: Oct. 1, 1997

Related U.S. Application Data

[63] Continuation of Ser. No. 630,564, Apr. 10, 1996, abandoned, which is a continuation of Ser. No. 45,685, Apr. 14, 1993, abandoned.

[30] Foreign Application Priority Data

Apr. 17, 1992 [JP] Japan .................................. 4-097811
Apr. 2, 1993 [JP] Japan .................................. 5-076704

[51] Int. Cl.$^6$ .............................. H04N 1/40; H04N 1/46; G03F 3/08
[52] U.S. Cl. ...................... 358/298; 358/519; 358/521; 358/523; 358/538
[58] Field of Search ................................... 358/298, 502, 358/518, 519, 521, 523, 537, 538; 382/162, 167, 191, 254, 270, 302

[56] References Cited

U.S. PATENT DOCUMENTS

| | | | |
|---|---|---|---|
| 4,926,268 | 5/1990 | Kawamura et al. | 358/298 X |
| 4,931,864 | 6/1990 | Kawamura et al. | 358/519 |
| 4,980,760 | 12/1990 | Hiratsuka et al. | 358/80 |
| 5,079,624 | 1/1992 | Susuga et al. | 358/75 |
| 5,157,483 | 10/1992 | Shoji et al. | 358/75 |
| 5,206,719 | 4/1993 | Ikeda et al. | 358/80 |
| 5,309,258 | 5/1994 | Kouno et al. | 358/523 |
| 5,315,382 | 5/1994 | Tanioka | 358/523 |

*Primary Examiner*—Eric Frahm
*Attorney, Agent, or Firm*—Fitzpatrick, Cella, Harper & Scinto

[57] ABSTRACT

A sensor produces an image signal indicative of the image of an original. The image signal is subjected to various types of processing by units ranging from an A/D converter 3 to a space filter 13. In an ordinary operating mode, the processing signal is subjected to a γ conversion by a γ conversion table set by a controller 21. If a gradation processing mode has been designated by the user, gradation processing is executed by a gradation processing conversion table set by the controller 21.

50 Claims, 7 Drawing Sheets

$$\begin{Bmatrix} C' \\ M' \\ Y' \\ K' \end{Bmatrix} = \begin{Bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{Bmatrix} \begin{Bmatrix} C \\ M \\ Y \\ K \end{Bmatrix}$$

FIG. 5

| a | b | c |
|---|---|---|
| h | S | d |
| g | f | e |

IMAGE PROCESSING APPARATUS AND METHOD FOR APPLYING SPECIAL IMAGE EFFECTS TO OUTPUT IMAGES

This application is a continuation of application No. 08/630,564 filed Apr. 10, 1996, now abandoned, which was a continuation of application No. 08/045,685 filed Apr. 14, 1993, now abandoned.

BACKGROUND OF THE INVENTION

1. Field of the Invention

This invention relates to an image processing apparatus and method, such as a copier, that is capable of applying special image effects to an output image.

2. Description of the Related Art

Techniques for achieving a faithful reproduction of an original when copying an image of the original have long been sought. The same is true with so-called digital copiers, in which the image of an original is processed as digital multivalued data. Further, with a digital copier, it is possible to apply special effects to an image using the same processing system that is employed to produce a faithful image. One example of such a digital copier has a data conversion table (hereinafter referred to as a "γ conversion table") When the image of an original is read as multivalued data and printed by the printing unit of the copier, the γ conversion table adjusts a discrepancy in density characteristics between the reading system and printing system of the copier.

It would be desirable for such a conventional digital copier to possess a function capable of applying special effects to an image. Specifically, it would be desirable if the copier could execute gradation processing for converting continuous density tones, such as in a photograph, into discontinuous density tones of the kind found in animations. Particularly desirable is a compact copier with which these special image effects can be realized using as little hardware as possible.

SUMMARY OF THE INVENTION

Accordingly, an object of the invention is to provide an image processing apparatus and method in which diverse gradation processing can be achieved.

According to the present invention, the foregoing object is attained by providing an image processing apparatus comprising input means for inputting image data having a plurality of levels, converting means for converting the number of levels of said image data, and designating means for manually designating the number of levels into which said image data is converted by said converting means.

Another object of the invention is to provide a copying apparatus equipped with diverse editing functions.

According to the present invention, the foregoing object is attained by providing a copying apparatus comprising reading means for reading an image of an original and outputting multitoned image data, converting means for converting the number of tones of the multitoned image data, and designating means for designating the number of tones of the image data after the conversion performed by the converting means.

A further object of the invention is to provide an image processing apparatus in which the tonality of an image represented by binary image data can be changed.

According to the present invention, the foregoing object is attained by providing an image processing apparatus comprising input means for entering multitoned image data, converting means for converting the number of tones of the image data, designating means for designating the number of tones of the image data after the conversion performed by the converting means, and binarizing means for binarizing the image data converted by the converting means.

Yet another object of the invention is to provide an image processing apparatus in which the tonality of an image is changed for every area of the image.

According to the present invention, the foregoing object is attained by providing an image processing apparatus comprising input means for entering multitoned image data, first designating means for designating an area on an image represented by the image data, converting means for converting the number of tones of the image data contained in the area, and second designating means for designating the number of tones of the image data after the conversion performed by the converting means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described in detail with reference to the drawings.

First Embodiment

Figure 1:
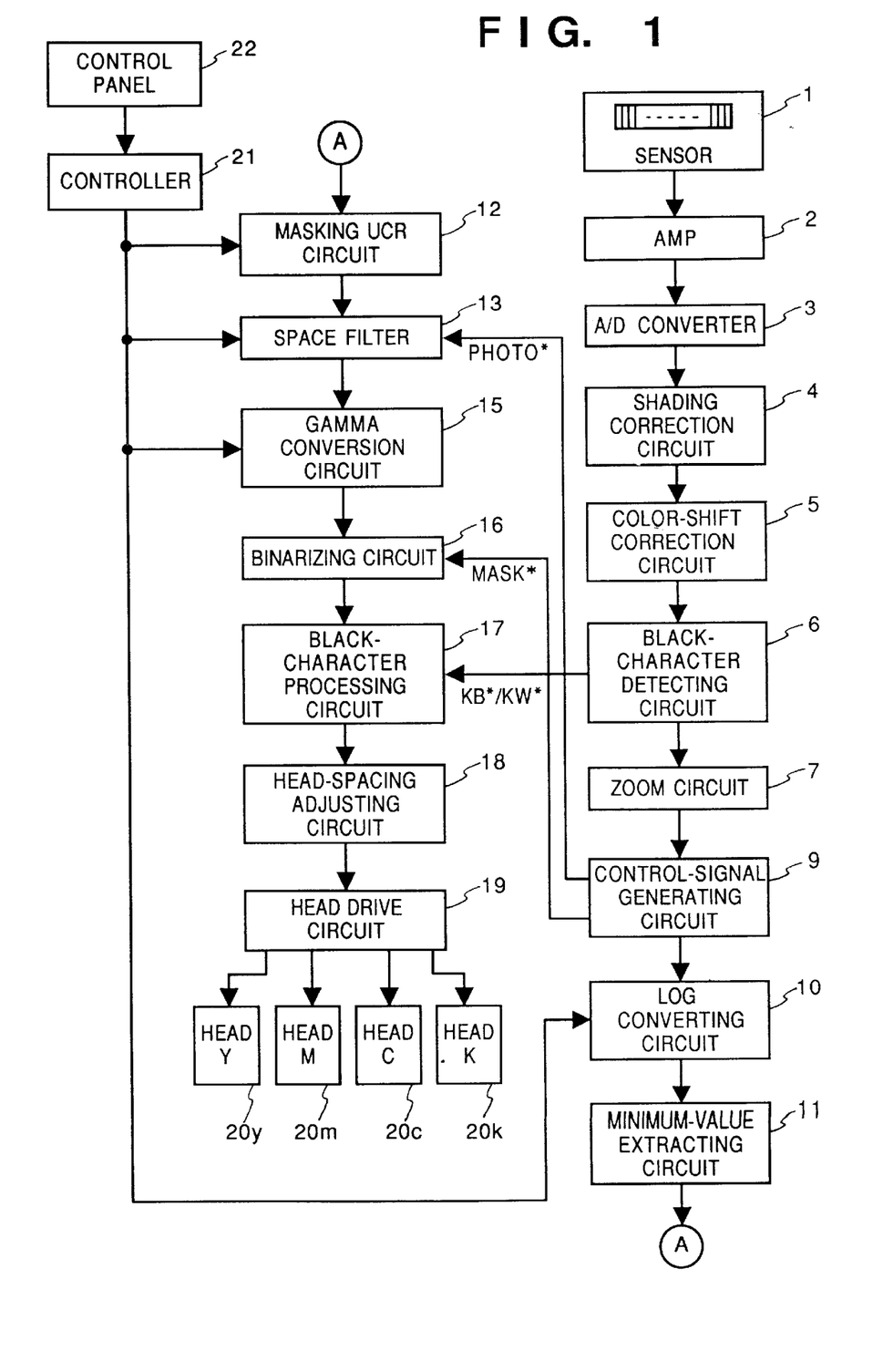
FIG. 1 is a block diagram illustrating the configuration of a color copier embodying the present invention.

FIG. 1 is a block diagram illustrating the configuration of a color copier embodying the present invention.

The copier shown in FIG. 1 includes a CCD line sensor 1 for reading the image of an original and outputting an RGB analog signal, an amplifier (AMP) 2 for amplifying the output of the sensor 1, an A/D converter 3 for converting the RGB analog signal, which has been amplified by the AMP 2, into R, G, B digital signals each consisting of eight bits, a shading correction circuit 4 for applying a shading correction to the RGB image data outputted by the A/D converter 3, a color-shift correction circuit 5 that calculates the weighted mean of mutually adjacent pixels and corrects a positional deviation of the RGB image data outputted by the shading correction circuit 4, a black-character detecting circuit 6 for detecting a black-character area from the RGB image data, which has been outputted by the color-shift correction circuit 5, and outputting a black-character signal KB*/KW*, a zoom circuit 7 for applying zoom processing, such as enlargement and reduction processing, to the RGB image data that has passed through the black-character detecting circuit 6, a control-signal generating circuit 9 for generating control signals PHOTO* and MASK*, described below, in dependence upon the RGB data outputted by the zoom circuit 7, a logarithmic converting circuit 10 comprising a look-up table (LUT) for converting the data space of the image data, which has passed through the control-signal generating circuit 9, based upon a conversion table stored in a RAM, a minimum-value extraction circuit 11 for extracting a minimum value of the image data outputted by the logarithmic converting circuit 10, a masking UCR circuit 12 for performing a matrix calculation based upon the coefficients stored in the RAM and applying masking processing and UCR processing to the image data outputted by the minimum-value extraction circuit 11, a space filter 13 for applying edge-emphasis processing or smoothing processing to the image data, which has been outputted by the masking UCR circuit 12, in dependence upon a control signal from a controller 21 or the control signal PHOTO* from the control-signal generating circuit 9, a gamma (density) conversion circuit 15 comprising a LUT for applying a γ correction to the image data, which has been outputted by the space filter 13, based upon the conversion table stored in the RAM, a binarizing circuit 16 for binarizing the image data, which has been outputted by the space filter 13, in accordance with a dither method or the like, a black-character processing circuit 17 for processing the black-character portion of the binary image data, which has been outputted by the binarizing circuit 16, in dependence upon the black-character signal KB*/KW* from the black-character detecting circuit 6, a head-spacing adjustment circuit 18 for outputting a print signal, at a timing confirming to the head spacing of four colors C, M, Y, K, in dependence upon the binary image data outputted by the black-character processing circuit 17, and a head drive circuit 19 for driving heads C20c, M20m, Y20y and K20k in conformity with the output of the head spacing adjustment circuit 18. The heads C20c, M20m, Y20y and K20k are ink-jet heads for jetting inks of the colors C, M, Y, K, respectively.

The controller 21 is constituted by a single-chip microcomputer and executes a copy sequence in accordance with a program that has been stored in an internal ROM. Stored within the internal ROM of the controller 21 are a plurality of conversion tables for the logarithmic converting circuit 10, a group of a plurality of matrix coefficients for the masking UCR circuit 12, and a plurality of conversion tables for the gamma conversion circuit 15. When the copier is started or when copy conditions are changed, the necessary conversion tables and matrix coefficients are set in these circuits.

Numeral 22 denotes a control panel employed by the user enter commands to the controller 21.

The copy sequence of this embodiment will now be described.

Figure 2:
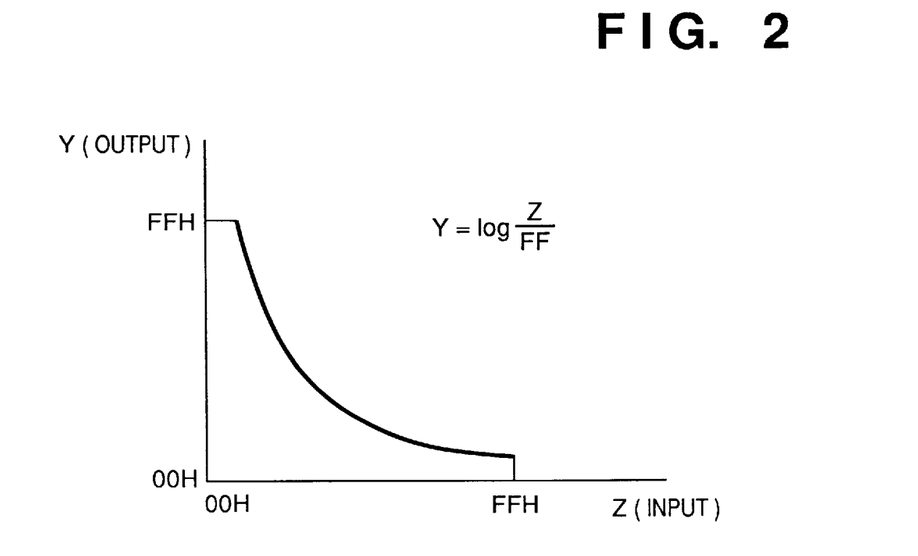
FIG. 2 is a diagram illustrating a conversion table provided in logarithmic converting circuit of FIG. 1.
Figure 3:
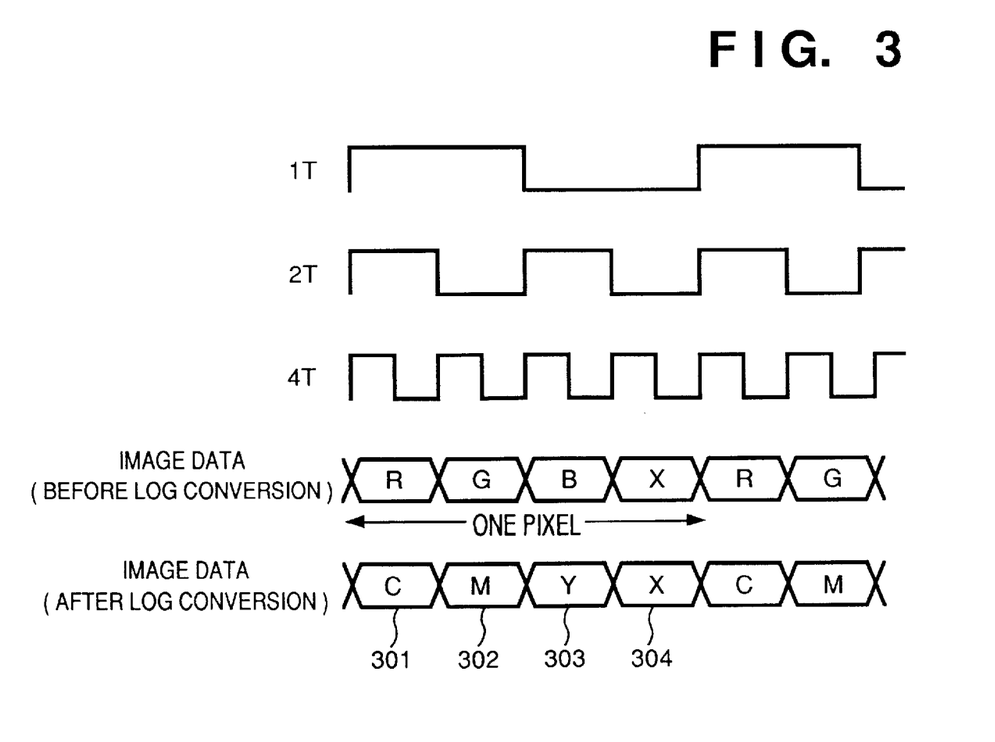
FIG. 3 is a timing chart showing the composition of image data in this embodiment.
Figure 4:
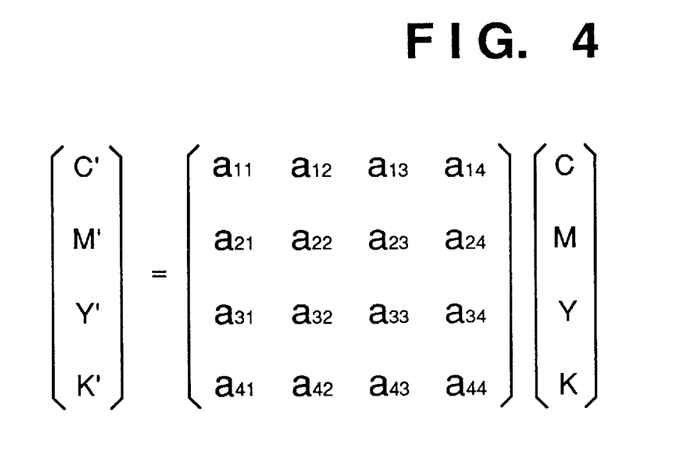
FIG. 4 is a diagram showing matrix coefficients of a masking UCR circuit in FIG. 1.
Figure 5:
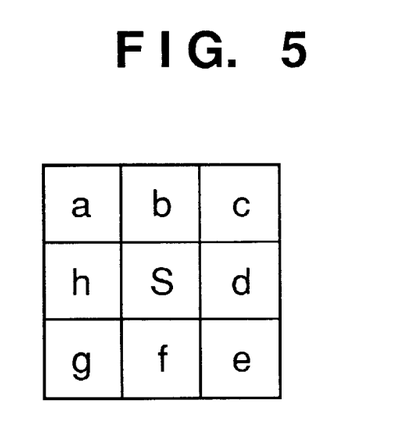
FIG. 5 is a diagram showing processing pixels of a space filter in FIG. 1.
Figure 6:
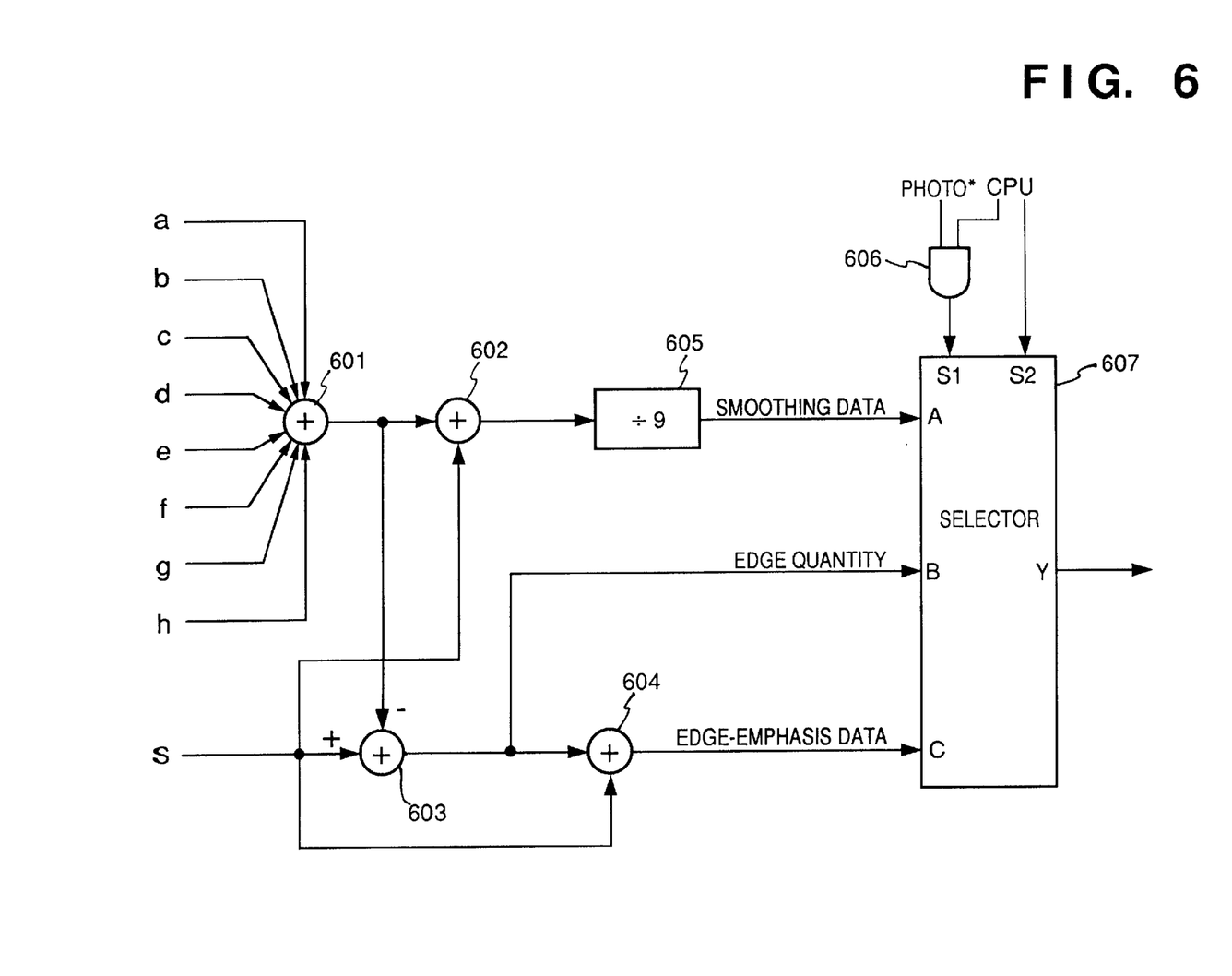
FIG. 6 is a block diagram showing the construction of the space filter of FIG. 1.
Figure 8:
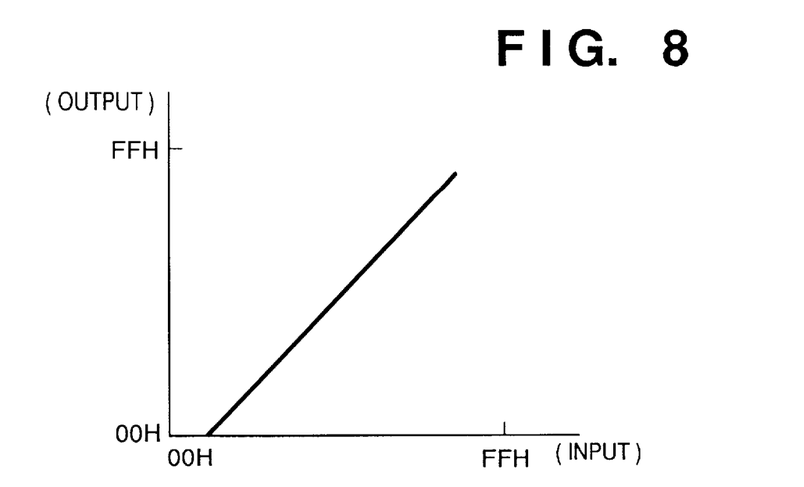
FIG. 8 is a diagram illustrating an example of a γ conversion table in a gamma conversion circuit shown in FIG. 1.
Figure 9A:
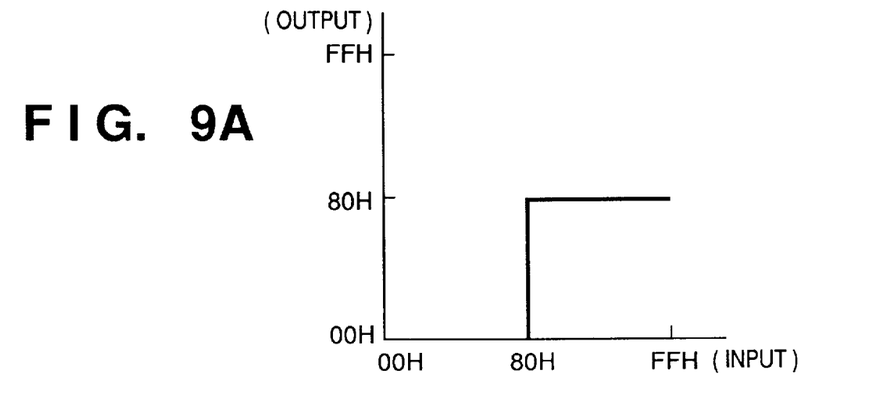
FIGS. 9A through 9C are diagrams showing examples of conversion tables for gradation processing in the gamma conversion circuit of FIG. 1.
Figure 9B:
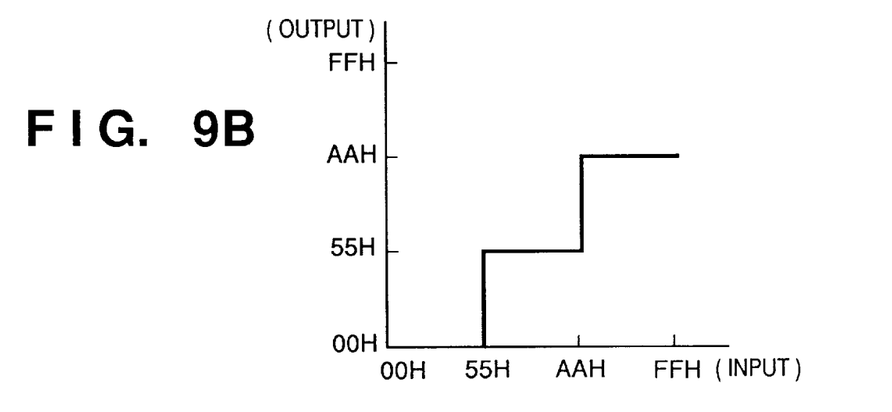
Figure 9C:
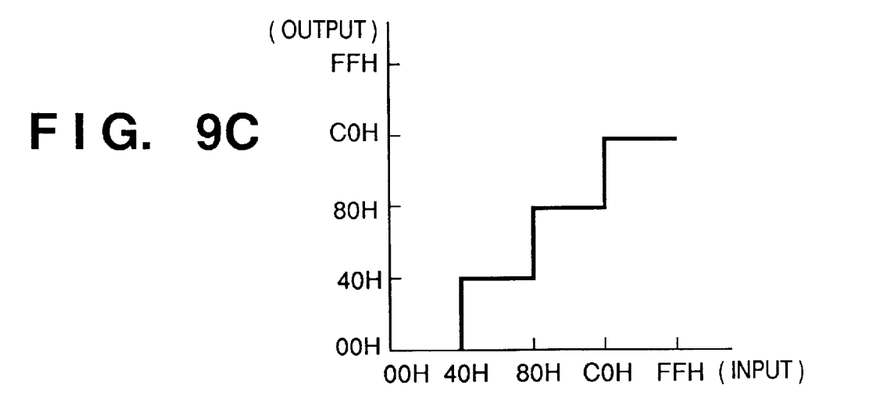

The drawings used in the description below are as follows: FIG. 2 illustrates a conversion table provided in the logarithmic converting circuit 10, FIG. 3 is a timing chart showing the composition of image data, FIG. 4 shows matrix coefficients of the masking UCR circuit 12, FIG. 5 shows processing pixels of the space filter 13, FIG. 6 shows the construction of the space filter 13, FIG. 7A through 7D shows examples of outputs of the space filter depicted 13, FIG. 8 shows an example of a γ conversion table in the gamma conversion circuit 15, and FIG. 9A through 9C shows examples of conversion tables for gradation processing in the gamma conversion circuit 15.

The user presses a copy starting button on the control panel 22, thereby starting a copy sequence described below. In a case where gradation processing for special effects is necessary, the user designates this processing mode and then selects the conversion table for gradation processing, described below, by means of the control panel 22 before pressing the copy starting button.

The analog image signal outputted by the sensor 1 and representing the image of the original is amplified by the AMP 2, after which the amplified signal is converted into the digital image signal by the A/D converter 3. The digital image signal outputted by the A/D converter 3 is subjected to a shading correction by the shading correction circuit 4, after which the RGB position deviation of the sensor 1 is corrected by the color-shift correction circuit 5.

Next, the black-character detecting circuit 6 detects a black-character area from the image data, which has been outputted by the color-shift correction circuit 5, and outputs the black-character signal KB*/KW*, which is for identifying pixels printed in black (K) ink and pixels that do not employ any black (K) ink. In other words, the signal KB* is produced with regard to pixels printed solely in K ink for black characters and the like, and the signal KW* is produced with regard to while pixels that employ no ink whatsoever.

The zoom circuit 7 then executes redundancy processing or thinning-out processing, whereby the image represented by the image data that has passed through the black-character detecting circuit 6 is enlarged or reduced. Next, based upon the image data outputted by the zoom circuit 7, the control-signal generating circuit 9 generates the signal PHOTO* that controls the edge-emphasis processing or smoothing processing of the space filter 13 and the signal MASK* that controls the binarizing circuit 16.

Based upon the conversion table set by the controller 21, the logarithmic converting circuit 10 converts the image data, which has passed through the control-signal generating circuit 9, from RGB (luminance) space to CMY (density) space. It should be noted that if the copier is in the ordinary copying mode, the conversion table of the kind shown in FIG. 2 is set in the logarithmic converting circuit 10 by the controller 21. Next, the minimum-value extracting circuit 11 detects the minimum value of the CMY image data outputted by the logarithmic converting circuit 10 and adopts the detected minimum value as data X in the image data configuration, shown at 304 in FIG. 3, that results from the logarithmic conversion.

The masking UCR circuit 12 performs a matrix calculation based upon the coefficients set by the controller 21, applies masking processing and UCR processing to the CMYX image data and outputs CMYK image data. When an ordinary copying operation is performed, data $a_{11}$~$a_{44}$ of the kind shown in FIG. 4 is set as the matrix coefficients of the masking UCR circuit 12 by means of the controller 21.

Next, the space filter 13 applies processing to nine pixels in which the center pixel is a pixel of interest S, as shown in FIG. 5. The processing executed by the space filter 13 will now be described in detail with reference to FIG. 6, which illustrates the construction of the space filter 13, and FIGS. 7A through 7D showing examples of density characteristics of image data.

Figure 7A:
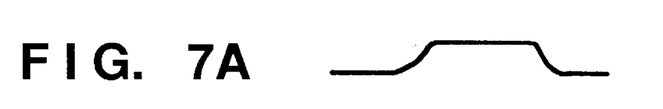
FIGS. 7A through 7D are diagrams showing outputs of the space filter depicted in FIG. 6.
Figure 7B:
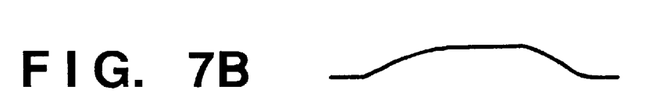
Figure 7C:
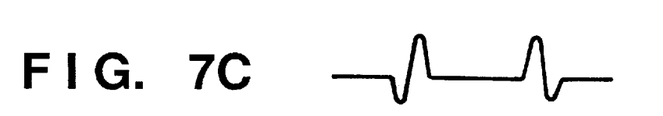
Figure 7D:
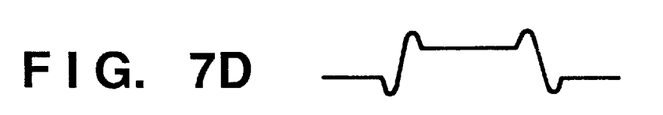

The space filter 13 includes adders 601, 602, which calculate the sum total of the total of nine pixels composed of the peripheral pixels a~h and pixel of interest S that indicate a density characteristic of the kind shown in FIG. 7A, and a divider 605 for dividing the output of the adder 602 by nine, namely the total number of pixels, thereby obtaining smoothing data of the kind shown in FIG. 7B. The space filter 13 further includes an adder 603, which subtracts the output of the adder 601 (the sum of the data of the peripheral pixels a~h) from the data of the pixel of interest S, thereby obtaining an edge quantity of the kind shown in FIG. 7C, and an adder 604, which adds the edge quantity from the adder 603 and the data of the pixel of interest S, thereby obtaining edge-emphasis data of the kind illustrated in FIG. 7D.

The smoothing data, edge quantity and edge-emphasis data enters respective input terminals A, B, C of a selector 607. In accordance with a two-bit selection signal applied to select terminals S1, S2 from the controller 21 and the control signal PHOTO* from the control-signal generating circuit 9, the selector 607 outputs one of the three items of data applied to the input terminals A, B, C. An AND gate 606 takes the logical AND between one bit of the selection signal from the controller 21 and the control signal PHOTO*. Selection based upon the signal PHOTO* is carried out in a case where image processing is changed for each designated area. In the case of the ordinary copying operation, the selector 607 outputs the smoothing data or edge-emphasis data in response to the selection signal or control signal PHOTO* from the selector 21.

Next, on the basis of the conversion table set by the controller 21, the gamma conversion circuit 15 applies a γ conversion to the image data outputted by the space filter 13. More specifically, the density of the image data inputted to the gamma conversion circuit 15 is converted into density that conforms to the ink and recording paper or to the designation made by the user. When the copier performs the ordinary copying operation, a conversion table of the kind shown in FIG. 8 is set in the gamma conversion circuit 15 by the controller 21. The conversion table of the gamma conversion circuit 15 is prepared for each of the colors C, M, Y, K. For example, if the recording paper and inking system are such that it is difficult for the color Y (yellow) to develop, then processing is executed to enlarge the value of the Y data (i.e., to increase the Y density).

In a case where the gradation processing mode has been designated by the user, any of the conversion tables for gradation processing (shown in FIGS. 9A through 9C) conforming to the designation made at the control panel 22 is set in the gamma correction circuit 15 by the controller 21. Accordingly, the gamma correction circuit 15 applies gradation processing to the image data, which has been outputted by the space filter 13, using the conversion table that has been set.

FIG. 9A illustrates an example of a conversion table for gradation processing of two tones. In this case, image data of one color and 256 tones is converted into image data of two tones. That is, if data of all four colors C, M, Y, K is processed by using this conversion table, an image expressed in 16 colors is formed.

FIG. 9B illustrates an example of a conversion table for gradation processing of three tones. In this case, the image data of one color and 256 tones is converted into image data of three tones. That is, if data of all four colors C, M, Y, K is processed by using this conversion table, an image expressed in 81 colors is formed.

FIG. 9C illustrates an example of a conversion table for gradation processing of three tones. In this case, the image data of one color and 256 tones is converted into image data of four tones. That is, if data of all four colors C, M, Y, K is processed by using this conversion table, an image expressed in 256 colors is formed.

In this embodiment, the conversion tables for gradation processing are not limited to the three types shown in FIGS. 9A through 9C. A plurality of conversion tables in which tone-transition density, tone density and number of tones are set at will can be stored in the ROM of the controller 21 beforehand, and the user can employ the control panel to select the desired conversion table from among the plurality of conversion tables stored in the ROM.

Next, the binarizing circuit 16 binarizes the image data, which has been outputted by the gamma conversion circuit 15, in accordance with the dither method, by way of example. The binarizing circuit 16 cuts the output of the binarized image data, which corresponds to an area for which trimming has been designated, in dependence upon the control signal MASK* from the control-signal generating circuit 9. Next, in conformity with the black-character signal KB*/KW* from the black-character detecting circuit 6, the black-character processing circuit 17 processes the binary image data from the binarizing circuit 16 in such a manner that a black-character area will be printed in K ink while no ink is used for white pixels. The head-spacing adjusting circuit 18 converts the binary image data from the black-character processing circuit 17 into a print signal whose print timing for each color is adjusted in conformity with the spacing between the heads. The head driver circuit 19 outputs ink-head drive signals in dependence upon the print signal from the head-spacing adjusting circuit 18. The heads 20c~20k form an image on the recording paper by jetting inks in conformity with the ink-head drive signals.

Thus, in accordance with the present invention as described above, a gradation-processed image having tones of any number of stages can be formed merely by changing the conversion table of the gamma conversion circuit 15. As a result, a gradation processing function can be added to a color copier without raising the cost of the apparatus.

Second Embodiment

Figure 10:
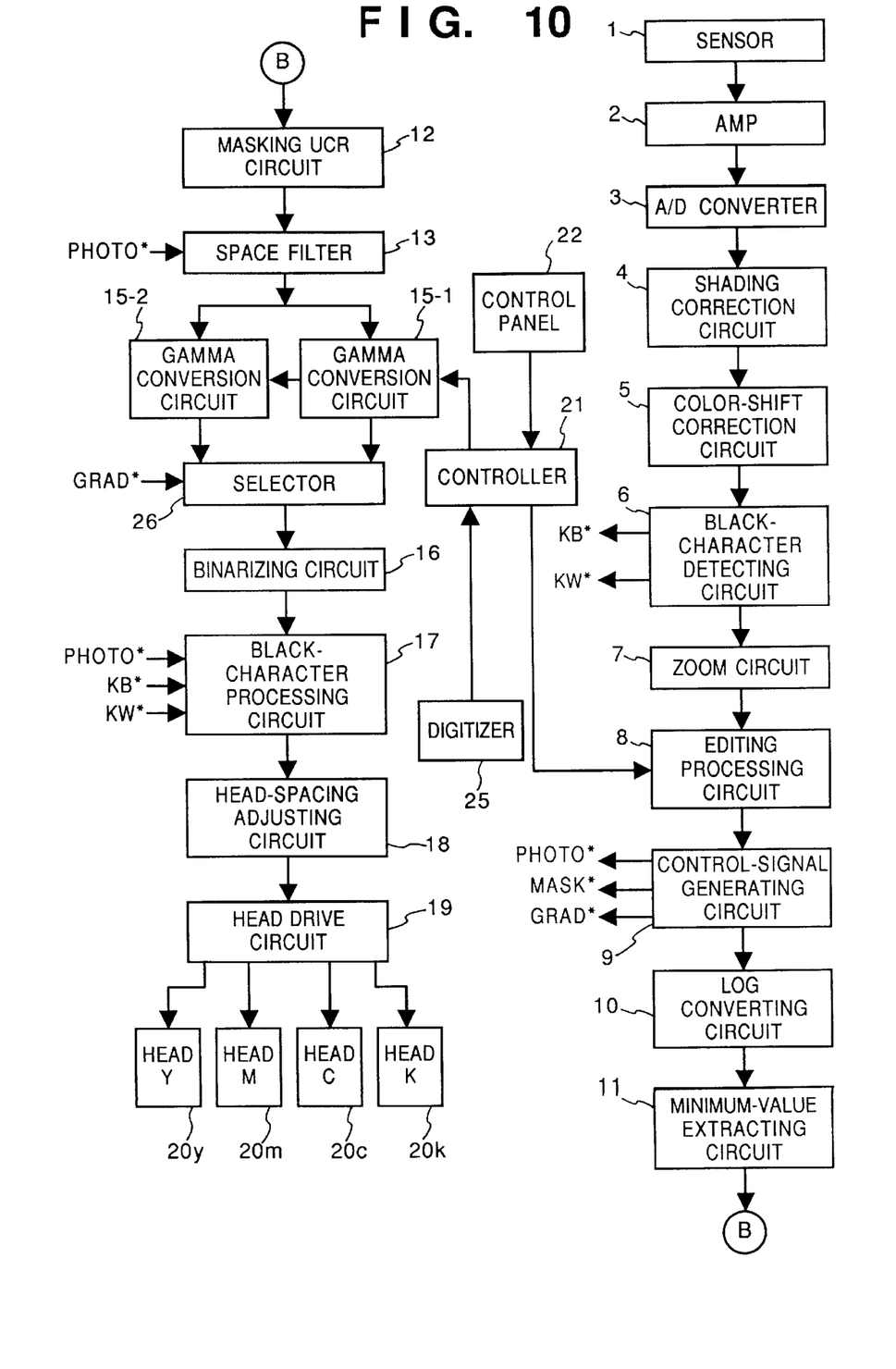
FIG. 10 is a block diagram illustrating a second embodiment of the present invention.

FIG. 10 is a block diagram illustrating a second embodiment of the present invention. The following description will focus mainly on those portions that differ from the first embodiment shown in FIG. 1.

In FIG. 10, numeral 8 denotes an editing processing circuit for generating a gamma-table selecting signal GRAD*, which selects one of a plurality of gamma tables. Numeral 9 denotes a control-signal generating circuit which, besides generating the control signals PHOTO* and MASK*, separates and outputs the selecting signal GRAD*.

Numerals 15-1, 15-2 denote gamma conversion circuits each constituted by a RAM. Conversion tables that perform a γ conversion by density conversion characteristics that differ from each other are set in these circuits by the controller 21.

Numeral 25 denotes a digitizer used to designate an image area on an original.

Numeral 26 denotes a selector for selecting an output from the gamma conversion circuit 15-1 or 15-2 in dependence upon the selecting signal GRAD*.

In this arrangement, an editing processing signal is generated by the editing processing circuit 8. That is, the circuit 8 outputs the signal GRAD* with regard to an area designated for gray-level-transformation processing by the digitizer 25.

The control-signal generating circuit 9 outputs the signal PHOTO*, which controls the edge emphasis circuit, the signal MASK*, which controls the binarizing circuit, and the gray-level transformation signal GRAD*.

The gamma conversion circuits 15-1, 15-2 are each constituted by a RAM, the content of which can be rewritten by the controller 21. Print-density data is converted by the γ conversion into density conforming to a designated ink, paper or user.

In this embodiment, an image area on an original is designated by the digitizer 25, and the number of tones within this area is also designated by the digitizer 25, whereby image data having numbers of tones that differ in each of a plurality of areas can be obtained.

Further, in this embodiment, two gamma conversion circuits are provided. However, by providing three of more of these circuits, image data having large numbers of tones can be mixed within one screen.

Though the foregoing embodiment has been described taking an ink-jet printer as an example, printers employing electrophotography or thermal transfer also may be used.

Further, though use is made of the gamma conversion circuits when changing the number of tones, similar effects can be obtained even if the lower order bits of multivalued signal, for example, are omitted.

Though area designation is performed by the digitizer, this can also be carried out by entering coordinates using a ten-key pad, by way of example.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

input means for inputting first image data of a plurality of color components, each of said color components having a plurality of levels and the first image data having J colors;

first converting means for converting the first image data into second image data having L colors (L<J), such that a number of levels for each color component is reduced;

second converting means for converting the first image data into third image data having N colors (N<L), such that a number of levels for each color component is reduced; and selecting means for manually selecting one of said first and second converting means.

2. The apparatus according to claim 1, further comprising:

memory means for storing a plurality of density conversion characteristics; and setting means for selecting one of the plurality of density conversion characteristics stored in said memory means and for setting the selected density conversion characteristic is one of said first and second converting means.

3. The apparatus according to claim 2, wherein the density conversion characteristics stored in said memory means include at least one gradation conversion characteristic.

4. The apparatus according to claim 2, wherein the image data is C, M, Y, K image data, and the density conversion characteristics stored in said memory means include at least one set of gradation conversion characteristics for each of C, M, Y, K.

5. The apparatus according to claim 3, wherein said selecting means performs selection in advance.

6. The apparatus according to claim 3, wherein tone-transition density of the gradation conversion characteristics can be set at will in advance.

7. The apparatus according to claim 3, wherein tone density of the gradation conversion characteristics can be set at will in advance.

8. The apparatus according to claim 2, wherein each of said first and second converting means is a look-up table comprising a RAM for storing the plurality of density conversion characteristics.

9. An image processing method comprising:

an input step of inputting first image data of a plurality of color components, each of said color components having a plurality of levels and the first image data having J colors;

a first converting step of converting the first image data into second image data having L colors (L<J), such that a number of levels for each color component is reduced;

a second converting step of converting the first image data into third image data having N colors (N<L), such that a number of levels for each color component is reduced; and a selecting step of manually selecting one of said first and second converting steps.

10. A copying apparatus comprising:

reading means for reading an image of an original and outputting first image data of a plurality of color components, each of said color components having a plurality of levels and the first image data having J colors;

first converting means for converting the first image data into second image data having L colors (L<J), such that a number of levels for each color component is reduced;

second converting means for converting the first image data into third image data having N colors (N<L), such that a number of levels for each color component is reduced;

selecting means for manually selecting one of said first and second converting means; and forming means for forming an image based on the image data converted by one of said first and second converting means.

11. The copying apparatus according to claim 10, further comprising:

memory means for storing a plurality of density conversion characteristics; and setting means for selecting one of the plurality of density conversion characteristics stored in said memory means and for setting the selected density conversion characteristic in one of said first and second converting means.

12. The copying apparatus according to claim 11, wherein the density conversion characteristics stored in said memory means include at least one gradation conversion characteristic.

13. The copying apparatus according to claim 11, wherein the image data is C, M, Y, K image data, and the density conversion characteristics stored in said memory means include at least one set of gradation conversion characteristics for each of C, M, Y, K.

14. The copying apparatus according to claim 12, wherein said selecting means performs selection in advance.

15. The copying apparatus according to claim 12, wherein tone-transition density of the gradation conversion characteristics can be set at will in advance.

16. The copying apparatus according to claim 12, wherein tone density of the gradation conversion characteristics can be set at will in advance.

17. The copying apparatus according to claim 11, wherein each of said first and second converting means is a look-up table comprising a RAM for storing the plurality of density conversion characteristics.

18. The copying apparatus according to claim 10, wherein said forming means is an ink-jet printer.

19. A copying method comprising:

a reading step of reading an image of an original and outputting first image data of a plurality of color components, each of said color components having a plurality of levels and the first image data having J colors;

a first converting step of converting the first image data into second image data having L colors (L<J), such that a number of levels for each color component is reduced;

a second converting step of converting the first image data into third image data having N colors (N<L), such that a number of levels for each color component is reduced;

a selecting step of manually selecting one of said first and second converting steps; and a forming step of forming an image based on the image data converted at one of said first and second converting steps.

20. An image processing apparatus comprising:

input means for inputting first image data of a plurality of color components, each of said color component having a plurality of levels and the first image data having J colors;

first converting means for converting the first image data into second image data having L colors (L<J), such that a number of levels for each color component is reduced;

second converting means for converting the first image data into third image data having N colors (N<L), such that a number of levels for each color component is reduced;

selecting means for manually selecting one of said first and second converting means; and binarizing means for binarizing the image data converted by one of said first and second converting means which is selected by said selecting means.

21. The apparatus according to claim 20, further comprising:

memory means for storing a plurality of density conversion characteristics; and setting means for selecting one of the plurality of density conversion characteristics stored in said memory means, and for setting the selected density conversion characteristic in one of said first and second converting means.

22. The apparatus according to claim 21, wherein the density conversion characteristics stored in said memory means include at least one gradation conversion characteristic.

23. The apparatus according to claim 21, wherein the image data is C, M, Y, K image data, and the density conversion characteristics stored in said memory means include at least one set of gradation conversion characteristics for each of C, M, Y, K.

24. The apparatus according to claim 22, wherein said selecting means performs selection in advance.

25. The apparatus according to claim 22, wherein tone-transition density of the gradation conversion characteristics can be set at will in advance.

26. The apparatus according to claim 22, wherein tone density of the gradation conversion characteristics can be set at will in advance.

27. The apparatus according to claim 21, wherein each of said first and second converting means if a look-up table comprising a RAM for storing the plurality of density conversion characteristics.

28. An image processing method comprising:

an input step of inputting first image data of a plurality of color components, each of said color components having a plurality of levels and the first image data having J colors;

a first converting step of converting the first image data into second image data having L colors (L<J), such that a number of levels for each color component is reduced;

a second converting step of converting the first image data into third image data having N colors (N<L), such that a number of levels for each color component is reduced;

a selecting step of manually selecting one of said first and second converting steps; and a binarizing step of binarizing the image data converted at one of said first and second converting steps which is selected at said selecting step.

29. An image processing apparatus comprising:

input means for inputting first image data of a plurality of color components, each of said color components having a plurality of levels and the first image data having J colors;

designating means for designating an area of an image represented by the first image data;

first converting means for converting the first image data into second image data having L colors (L<J), such that a number of levels for each color component is reduced;

second converting means for converting the first image data into third image data having N colors (N<L), such that a number of levels for each color component is reduced; and selecting means for manually selecting one of said first and second converting means, wherein said first and second converting means perform the conversion in the area designated by said designating means.

30. The apparatus according to claim 29, further comprising:

memory means for storing a plurality of density conversion characteristics; and setting means for selecting one of the plurality of density conversion characteristics stored in said memory means, and for setting the selected density conversion characteristic in one of said first and second converting means.

31. The apparatus according to claim 30, wherein the density conversion characteristics stored in said memory means include at least one gradation conversion characteristic.

32. The apparatus according to claim 30, wherein the image data is C, M, Y, K image data, and the density conversion characteristics stored in said memory means include at least one set of gradation conversion characteristics for each of C, M, Y, K.

33. The apparatus according to claim 31, wherein said selecting means performs selection in advance.

34. The apparatus according to claim 31, wherein tone-transition density of the gradation conversion characteristics can be set at will in advance.

35. The apparatus according to claim 31, wherein tone density of the gradation conversion characteristics can be set at will in advance.

36. The apparatus according to claim 30, wherein each of said first and second converting means if a look-up table comprising a RAM for storing the plurality of density conversion characteristics.

37. An image processing method comprising:
an input step of inputting first image data of a plurality of color components, each of said color components having a plurality of levels and the first image data having J colors;
a designating step of designating an area of an image represented by the first image data;
a first converting step of converting the first image data into second image data having L colors (L<J), such that a number of levels for each color component is reduced;
a second converting step of converting the first image data into third image data having N colors (N<L), such that a number of levels for each color component is reduced; and
a selecting step of manually selecting one of said first and second converting steps;
wherein said first and second converting step perform the conversion in the area designated at said designating step.

38. An image processing apparatus comprising:
input means for inputting first image data of a plurality of color components, each of said color components having a plurality of levels and the first image data representing J colors;
first converting means for converting the first image data into second image data representing L colors (L<J), by reducing the number of levels for each color component;
second converting means for converting the first image data into third image data representing N colors (N<L), by reducing the number of levels for each color component;
selecting means for manually selecting one of said first and second converting means; and
image forming means for forming a visible color image on a recording medium based on the image data converted by one of said first and second converting means.

39. The apparatus according to claim 38, further comprising:

memory means for storing a plurality of density conversion characteristics; and
setting means for selecting one of the plurality of density conversion characteristics stored in said memory means, and for setting the selected density conversion characteristic in one of said first and second converting means.

40. The apparatus according to claim 39, wherein the density conversion characteristics stored in said memory means include at least one gradation conversion characteristic.

41. The apparatus according to claim 39, wherein the image data is C, M, Y, K image data, and the density conversion characteristics stored in said memory means include at least one set of gradation conversion characteristics for each of C, M, Y, K.

42. The apparatus according to claim 40, wherein said selecting means performs selection in advance.

43. The apparatus according to claim 40, wherein tone-transition density of the gradation conversion characteristics is set at will in advance.

44. The apparatus according to claim 40, wherein tone density of the gradation conversion characteristics is set at will in advance.

45. The apparatus according to claim 39, wherein each of said first and second converting means is a look-up table comprising a RAM for storing the density conversion characteristics.

46. The apparatus according to claim 38, further comprising extracting means for extracting a black component from the plurality of color components.

47. The apparatus according to claim 38, further comprising filter means for performing a filter processing on image data.

48. The apparatus according to claim 38, wherein said image forming means forms images of yellow, magenta, cyan and black.

49. The apparatus according to claim 38, wherein said image forming means is an ink-jet printer.

50. An image processing method comprising:
an input step of inputting first image data of a plurality of color components, each of said color components having a plurality of levels and the first image data representing J colors;
a first converting step of converting the first image data into second image data representing L colors (L<J), by reducing the number of levels for each color component;
a second converting step of converting the first image data into third image data representing N colors (N<L), by reducing the number of levels for each color component;
a selecting step of manually selecting one of said first and second converting steps; and
an image forming step of forming a visible color image on a recording medium based on the image data obtained at one of said first and second converting steps.

* * * * *